United States Patent [19]
Boehm

[11] Patent Number: 5,339,556
[45] Date of Patent: Aug. 23, 1994

[54] FOLDING FISH LANDING NET WITH IMPROVED HINGE MECHANISMS

[76] Inventor: George L. Boehm, P.O. Box 605, Ennis, Mont. 59729

[21] Appl. No.: 72,256

[22] Filed: Jun. 7, 1993

[51] Int. Cl.⁵ ............................................. A01K 77/00
[52] U.S. Cl. ........................................ 43/11; 43/12
[58] Field of Search .................... 43/11, 12, 7, 134; 16/321

[56] References Cited

U.S. PATENT DOCUMENTS

| | | |
|---|---|---|
| 317,820 | 5/1885 | McClintock . |
| 412,773 | 10/1889 | Meisselbach ............................. 43/12 |
| 844,594 | 2/1907 | Haskell ..................................... 43/12 |
| 1,430,221 | 9/1922 | Dukas . |
| 1,524,957 | 3/1925 | Sundberg ................................. 43/12 |
| 2,202,789 | 5/1940 | Benson ..................................... 43/12 |
| 2,205,229 | 6/1940 | Spriggs et al. .......................... 43/12 |
| 2,515,685 | 7/1950 | Ash .......................................... 43/12 |
| 2,683,321 | 7/1954 | Faber ....................................... 43/12 |
| 4,138,790 | 2/1979 | Schmucker .............................. 43/12 |
| 4,492,052 | 1/1985 | Davis ....................................... 43/12 |
| 4,706,404 | 11/1987 | Kun .......................................... 43/12 |
| 4,870,773 | 10/1989 | Schmucker et al. ..................... 43/12 |

*Primary Examiner*—P. Austin Bradley
*Assistant Examiner*—Chuck Y. Mah
*Attorney, Agent, or Firm*—Jansson & Shupe, Ltd.

[57] ABSTRACT

The disclosure is directed to a fish landing net having a handle and elongate first and second frame members, the outer ends of which are joined by a hinge-like mechanism. In the improvement, the outer ends extend along an axis and the mechanism is mounted for pivoting movement about the axis. The mechanism pivots between a first position preventing folding the frame members and a second position permitting folding such members. The mechanism is urged toward the first position by a coiled spring, the twisting force of which is manually overcome to fold the net. The net also has a similar novel hinge-like mechanism joining the inward ends of the frame members. The spring-biased hinge mechanism per se is also disclosed for joining tube-like pieces.

13 Claims, 9 Drawing Sheets

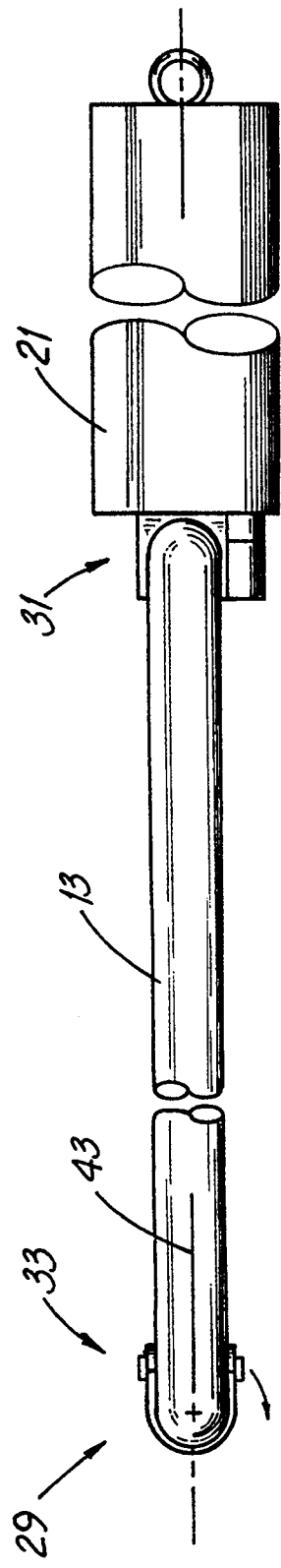
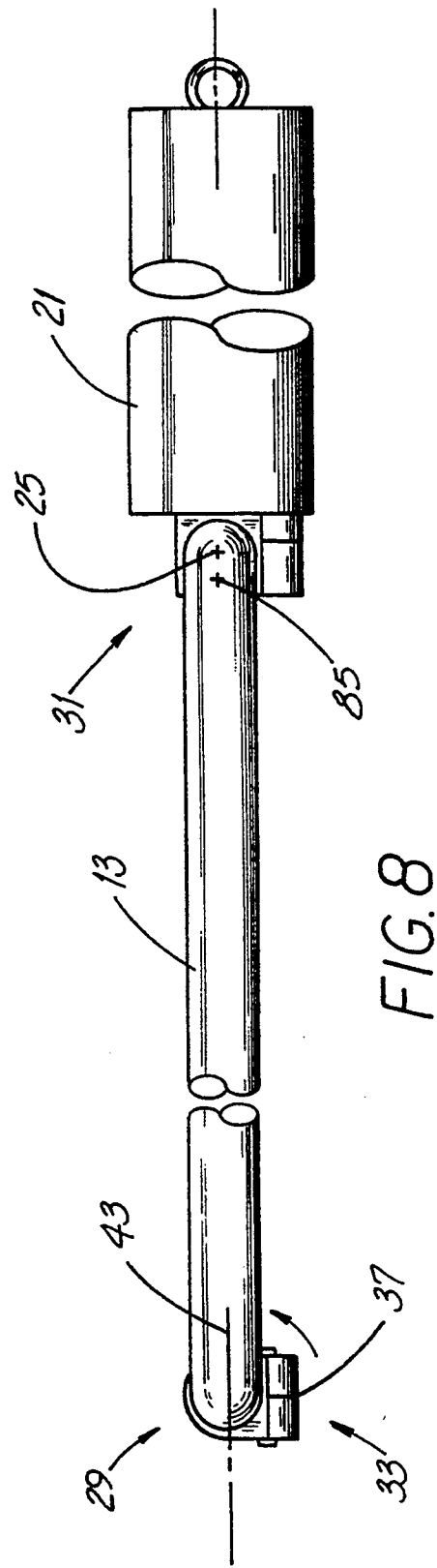

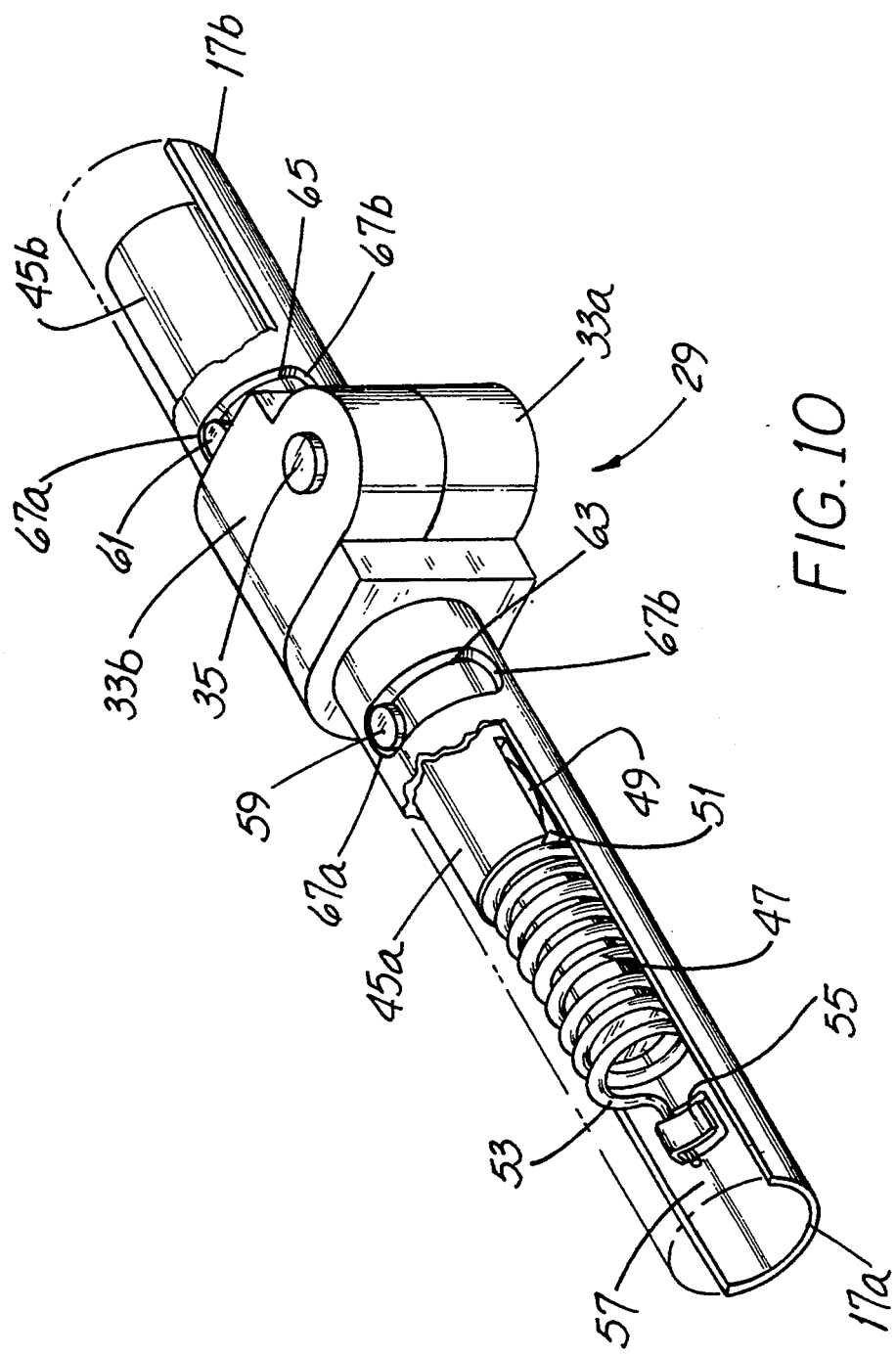

FOLDING FISH LANDING NET WITH IMPROVED HINGE MECHANISMS

FIELD OF THE INVENTION

This invention relates to outdoor sports and, more particularly, to fishing.

BACKGROUND OF THE INVENTION

Fishing is an activity having both commercial and sporting purposes. It is highly popular as an outdoor sport, largely because of the solitude (or companionship) and opportunity to enjoy natural scenic beauty which often attends such sport. Of course, the successful angler can look forward to a tasty meal.

And the sport has its economic aspects. Persons who enjoy fishing spend millions of dollars on fishing equipment. In some aspects of game fishing, e.g., lake fishing involving trolling or casting, participants go forth in boats laden with fishing gear of many types. Such gear may include heavy tackle boxes containing the latest lures, live bait containers, multiple fishing poles and, of course, a large landing net. Persons who outfit themselves in this way and who engage in this type of game fishing find such activity practical only with a boat— there is no other good way to transport and use the gear.

On the other hand, persons who fly-fish trout streams make it a point to minimize the amount of equipment to be carried and to buy equipment which is easy to pack, transport and use. It is not unusual for persons fishing for trout to fly to a site near their favorite location. And, of course, such air travellers know that it is desirable to minimize the weight and space needed for the fishing gear.

One of the potentially bulkiest but necessary items of equipment used by persons fishing for trout and similar fish is a landing net. In an effort to address the need for a compact yet effective net, folding landing nets have been made available. Such nets have varying degrees of complexity and ease of use. Folding landing nets are sold by Cabela's of Sidney, Neb., by The Global Flyfisher of Northbrook, Illinois, and by many others.

In the patent literature, examples of fish landing nets are shown in U.S. Pat. Nos. 2,515,685 (Ash); 317,820 (McClintock); 4,870,773 (Schmucker et al.); 1,430,221 ((Dukas) and 4,492,025 (Davis). The nets shown in such literature employ parts detachable from one another so that the net can be folded or, at least, "shape-modified" in some way.

For example, the device shown in the Ash patent involves a net frame having four segments fitted together. The outer ends of two segments are joined by what the patent describes as heads through which a bolt is passed and tightened when the net is in use. Such bolt as well as the handle and its locking nut are removed for net folding.

The net shown in the Schmucker et al. patent has flexible, curved arm-like members which telescope into rigid housing cylinders when the net is collapsed. The net has two spring-biased caps preventing the outer ends of the members from scissoring when the net is in use. Such caps must be manually, simultaneously pushed back (as the patent describes it) to permit such outer ends to come into registry during net setup. The caps are then released to hold such ends in that position.

While earlier landing nets have been generally satisfactory, many are characterized by certain disadvantages. One involves the fact that when folded for carrying, the user must contend with and keep track of several loose parts. The device shown in the Ash patent is a good example.

Loose parts are (or should be) anathema to anglers and to trout anglers in particular. This is so since trout anglers often unfold their nets directly over water or very near water's edge. Assuming the angler is successful in getting all of the loose parts to the fishing site, inadvertent dropping and loss of a part may prevent effective landing of caught fish.

Yet another disadvantage of certain known folding landing nets is their complexity in construction, in use or both. The net shown in the Schmucker et al. patent is an example in its use of a relatively large number of parts, some telescoping, and the need for a degree of manual dexterity when setting up the net for use.

An improved landing net which has no loose parts, which is highly compact and which is very easy to set up for use and fold for stowage and travel would be an important advance in the art.

OBJECTS OF THE INVENTION

It is an object of the invention to provide an improved fish landing net overcoming some of the problems and shortcomings of prior art landing nets.

Another object of the invention is to provide an improved fish landing net wherein all of the parts are (or may be) attached together when the net is folded for transport as well as when the net is in use.

Another object of the invention is to provide an improved fish landing net which reduces the number of parts required.

Yet another object of the invention is to provide an improved fish landing net which requires very little manual dexterity to set the net up for use or fold it for travel. How these and other objects are accomplished will become more apparent from the following detailed description and the drawing.

SUMMARY OF THE INVENTION

The invention involves improvements in a fish landing net having a handle and elongate, tube-like first and second frame members. The frame members (to which the net is attached) are bow-shaped or J-shaped and each frame member has an outer end away from the net handle and an inward end adjacent to the handle. The outer ends are joined by a hinge-like outer mechanism.

In the improvement, the outer ends extend along an axis and the outer mechanism is mounted for rotational, pivoting movement about the axis. Such pivoting movement is between a first position and a second position. In the first position, the mechanism forms a substantially rigid, beam-like structure preventing folding the frame members. In the second position, the mechanism permits folding such members.

More specifically, when the net is unfolded ready for use, the frame members lie define and thus lie generally in a plane. The outer mechanism includes first and second link members preferably permanently attached to one another by a pin-like fastener permitting relative movement of the link members one to another. Each link member has a substantially planar face in sliding contact with the face of the other member.

When the mechanism is in the first position, the faces are substantially coincident with the plane so that the mechanism (then exhibiting structural characteristics like a beam) resists bending and folding. On the other hand, when the mechanism is pivoted or rotated about 90° to the second position, the faces are substantially normal to the plane, the mechanism exhibits characteristics like a hinge and the frame members can be folded toward one another.

In other aspects of the invention, the outer mechanism is urged toward the first position by a spring. Thus, the relatively-light torque exerted by such spring is manually overcome to pivot the mechanism to its second, "fold-up" position.

At least one link member has a pin moving in a slot when the outer mechanism is pivoted between the first and second positions. The pin and slot coact to limit pivoting movement. That is, the slot has first and second ends and the pin, urged by the spring, is at the first slot end when the outer mechanism is in the first position. Such pin is at the second slot end when the outer mechanism is manually rotated to the second position.

Briefly summarizing, the outer mechanism is spring-biased toward its first position and when the net is unfolded, such mechanism automatically assumes that position and acts as a beam to prevent the frame members from spontaneously re-folding. When the user wishes to stow the new landing net, s/he urges the outer mechanism to its second position using thumb or finger pressure. The "slide-by" faces of the link members are then positioned normal to the plane defined by the frame members and the net can then be readily folded. It should also be appreciated that when the net is unfolded, the outer mechanism automatically snaps into position—no manipulation of such mechanism by the user is required.

The above describes some of the novel features of the outer mechanism joining those ends of the frame members away from the user. But that is not all. The highly preferred embodiment of the improved landing net has additional features relating to the inward hinge-like mechanism adjacent to the handle which makes such net very convenient to use and compact to carry.

The inward ends of the frame members (those ends adjacent to the handle) are joined by a hinge-like inward mechanism having first and second generally C-shaped members coupled to one another by a pin-like fastener. The second C-shaped member has a groove across it. The first C-shaped member includes a handle mounting block pinned thereto for swinging movement of the block into and out of the groove.

When the net is unfolded, the C-shaped members are brought to a position where they are generally in registry with one another. The block is "swung" into the groove and substantially prevents relative movement of the C-shaped members one to the other. The net is thus retained unfolded ready for use.

To put it another way, the C-shaped members are fastened together to permit relative "scissors-like" movement of the members one to the other. When the handle mounting block is pivoted into the groove, such block prevents such scissors-like movement and retains the C-shaped members "locked" together, i.e., relatively immovable one to the other. After the block is so positioned, the handle is tightened by means described below.

The handle mounting block has a handle stud extending from it and the handle is threaded to the stud. By rotating the handle with respect to such stud, the user may tighten the handle preparatory to using the net or may loosen it so that the block can be swung 180° out of the groove and the net then folded.

In the highly preferred embodiment, the stud has a handle retaining device, e.g., a lock washer, attached thereto near the stud distal end. The handle includes a bushing having a threaded aperture through it for receiving the stud. Since the aperture is smaller than the retaining device and since the bushing is interposed between the mounting block and the retainer, the handle is retained on the stud. However, such handle may be loosened or tightened for the purposes described above.

In another embodiment, the retaining device is omitted so that the handle may simply be removed entirely. As explained below, one of the desirable features of the new landing net is that there need not be any loose parts to manipulate or become lost. While the configuration having no retaining device is somewhat simpler in construction, it increases the risk that the handle might become lost. In yet another configuration, the stud is permanently attached to the handle and the mounting block has a threaded hole to receive such stud.

While the outer hinge-like mechanism has been briefly described in connection with an improved landing net, such mechanism has great utility per se in joining elongate first and second tube-like pieces. Such pieces may be said to have a long axis coincident with a reference plane, e.g., a vertical plane.

The hinge-like mechanism includes first and second link members, each having a face in substantially coplanar contact with the face of the other member. The link members are mounted for movement between first and second positions relative to the pieces. In the first position, the "slide-by" faces are substantially normal to the reference plane and the mechanism forms a beam-like structure. In the second position, the faces are substantially coincident with the reference plane and the pieces are relatively movable one to the other in the reference plane.

More specifically, the first link member has a barrel-like portion in telescoped relationship to the first piece and the mechanism includes a spring torsionally biasing the link members toward the first or "lock up" position. The inward or first end of the spring (i.e., that end closest to the link members) has a first end attached to the barrel-like portion to exert torque on such portion and, therefore, on the link members. To provide an "anchor" for the spring, its second or outward end is fixed with respect to the first tube-like piece.

Further details of the invention are set forth in the following detailed description and in the drawing.

BRIEF DESCRIPTION OF THE DRAWING

FIG. 7 is a side elevation view of the frame assembly of FIG. 2 and showing the outer mechanism in a beam-like locked position.

FIG. 8 is a side elevation view of the frame assembly of FIG. 2 and showing the outer mechanism in a joint-like hinging position.

FIG. 10 is an enlarged perspective view of the outer mechanism of FIGS. 3–6 with parts broken away. The mechanism is shown in the locked position as when the net is in use.

DETAILED DESCRIPTION OF PREFERRED EMBODIMENTS

Figure 1:
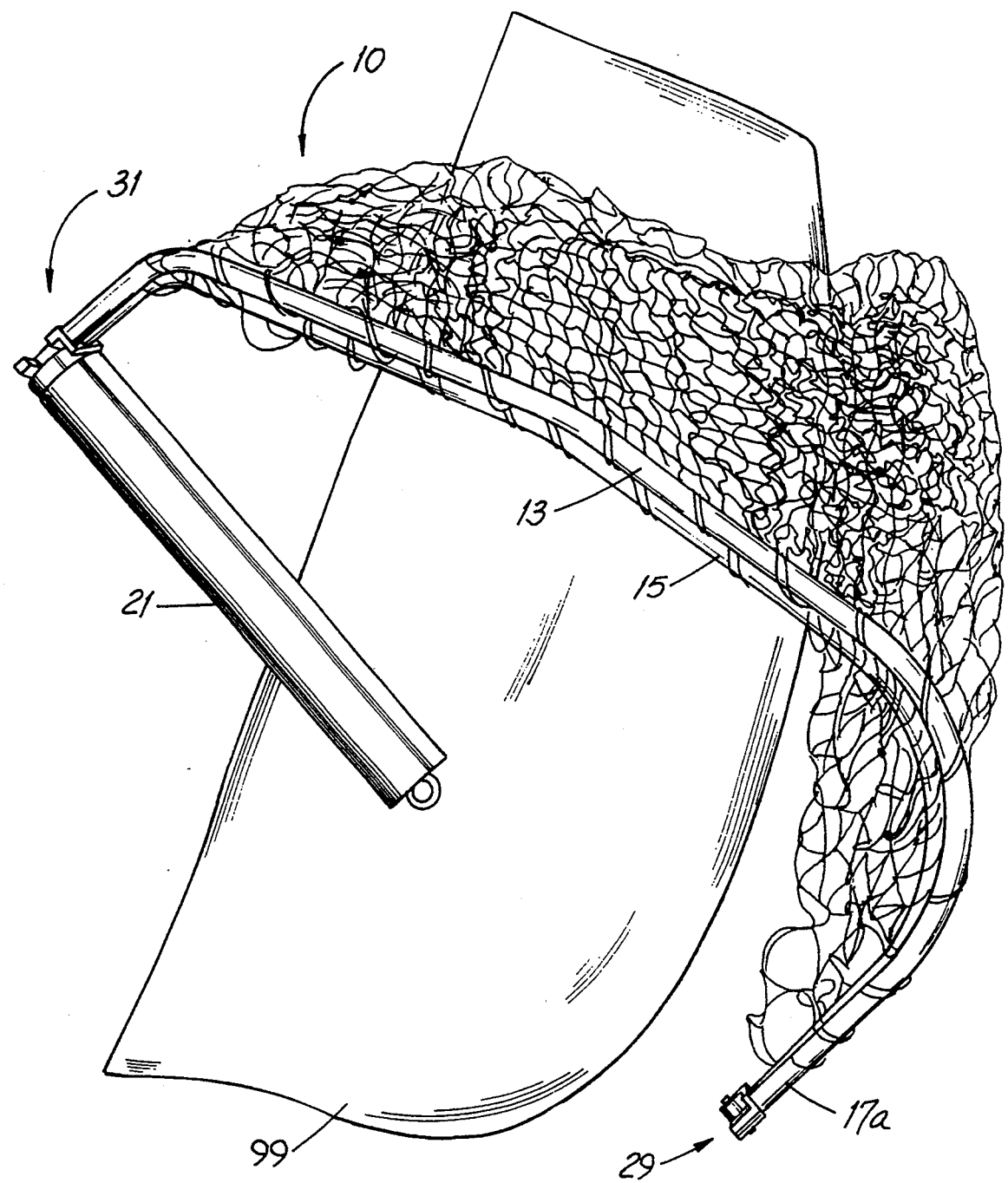
FIG. 1 is a perspective view of the improved landing net shown in conjunction with a carrying pouch.
Figure 2:
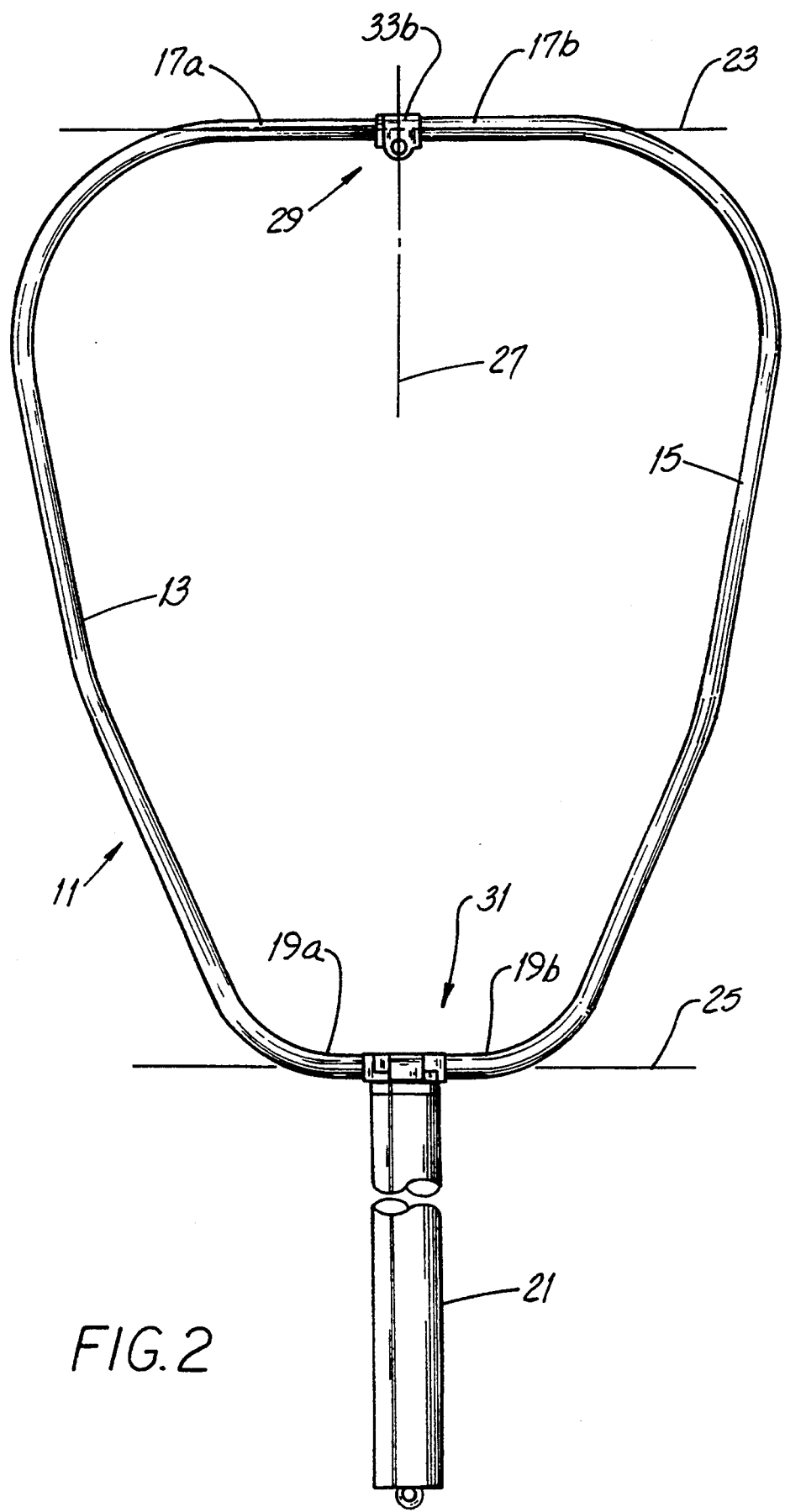
FIG. 2 is a top plan view of the outer and inward "lockup/foldup" mechanisms together with the frame assembly (the frame and handle components) of the net of FIG. 1.

Referring to FIGS. 1 and 2, the improved landing net 10 has a frame 11 made of two frame members 13, 15. Such members 13, 15, preferably fabricated of rigid, lightweight, hollow tubing, each have an outer end 17a, 17b, respectively, away from the handle 21 and an inward end 19a, 19b, respectively, adjacent to the handle 21. The illustrated frame members 13, 15 are somewhat bow-shaped or J-shaped and the outer ends 17a, 17b and inward ends 19a, 19b extend along axes 23 and 25, respectively. Such axes 23, 25 are generally normal to the long axis 27 of the frame 11 and generally parallel to one another.

The net 10 also includes a hinge-like outer mechanism 29 and a hinge-like inward mechanism 31, details of each of which are described below. The outer mechanism 29, including its two link members 33a, 33b, is described first.

Referring to FIGS. 3–6, each of the outer ends 17a, 17b of the frame members 13, 15 is coupled to a link member, namely, first and second link members 33a and 33b, respectively. Such link members 33a, 33b are preferably identical in shape and are attached to one another in "mirror-image" fashion by a pin-like fastener 35. Fastening is in a manner such that the faces 37a, 37b can pivotably slide relative to one another while yet maintaining continuous, face-to-face contact. That is, the joint should be relatively snug and not "sloppily" fitted. And each of the faces 37a, 37b is a substantially planar.

Figure 3:
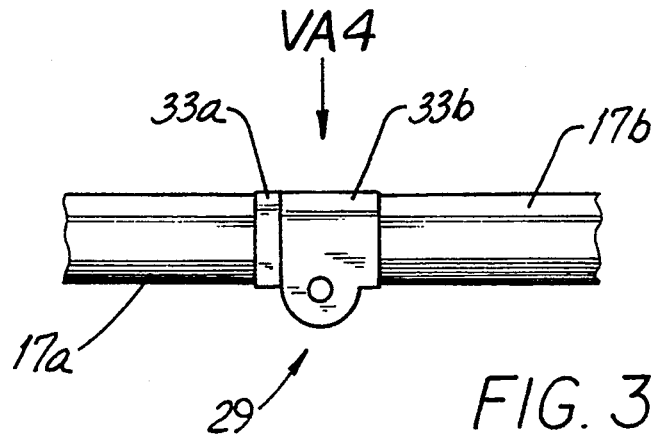
FIG. 3 is an enlarged top plan view of the outer mechanism shown in FIG. 2. Related frame parts are broken away.
Figure 4:
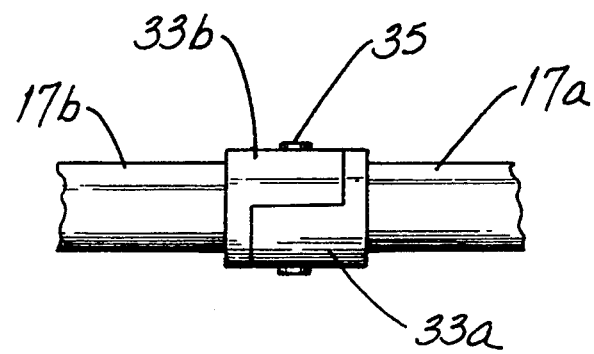
FIG. 4 is an elevation view of the mechanism of FIG. 3 as viewed from the outer end of the frame assembly shown in FIG. 2.
Figure 5:
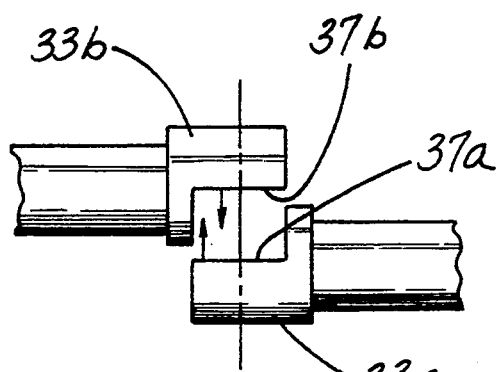
FIG. 5 is an elevation view of the mechanism of FIG. 4 with the mechanism parts slightly separated.

Each link member 33a, 33b also has an abutment shoulder 39a, 39b and an abutment face 41a, 41b which contact the face 41b, 41a and shoulder 39b, 39a, respectively, of the other member 33b, 33a when the outer mechanism 29 is in the position shown in FIGS. 2, 3 and 4. In other words, shoulder 39a contacts face 41b and shoulder 39b contacts face 41a. The faces 41a, 41b and shoulders 39a, 39b are preferably flat but other surface configurations can be used.

Referring additionally to FIGS. 2 and 7–10, FIGS. 2, 7, 9 and 10 show the link members 33 of the outer mechanism 29 in their first or "lockup" position. In such position, the faces 37 are generally coincident with (or at least parallel to) the plane 43 defined by the frame members 13, 15 and the handle 21. The outer mechanism 29 thus provides beam-like structural characteristics in that it prevents the ends 17 from being bent or angled up or down with respect to one another. Rigidity in the first position is enhanced by the fact that the abutment faces 37 and shoulders 39 are then in contact as described above.

Figure 11:
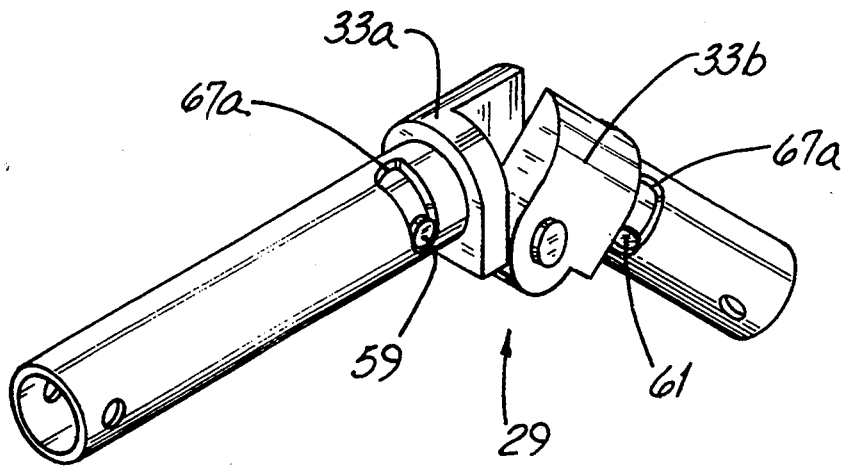
FIG. 11 is a perspective view of the mechanism of FIGS. 9 and 10 in the hinging position for net folding.

Referring now to FIGS. 8 and 11, the link members 33 of the outer mechanism 29 are shown in their second position. Comparing FIGS. 7 and 8, the second position is attained by rotating or pivoting the link members 33 from the first position about 90° clockwise to the second position. In such second position, the faces 37 are generally normal to the plane 43 and the mechanism 29 exhibits hinge-like characteristics. Thus, the frame members 13, 15 can be folded downward ("into" the drawing sheet of FIG. 2) as shown in FIG. 11. The fully folded net is shown in FIG. 1.

In a highly preferred embodiment, the outer mechanism 29 is constructed so that the link members 33 are spring-biased to the first or "lockup" position. Such members 33 must be manually urged to the second position to fold the net for stowage. Further details of the mechanism 29 including the way in which it is spring biased will now be provided.

Figure 9:
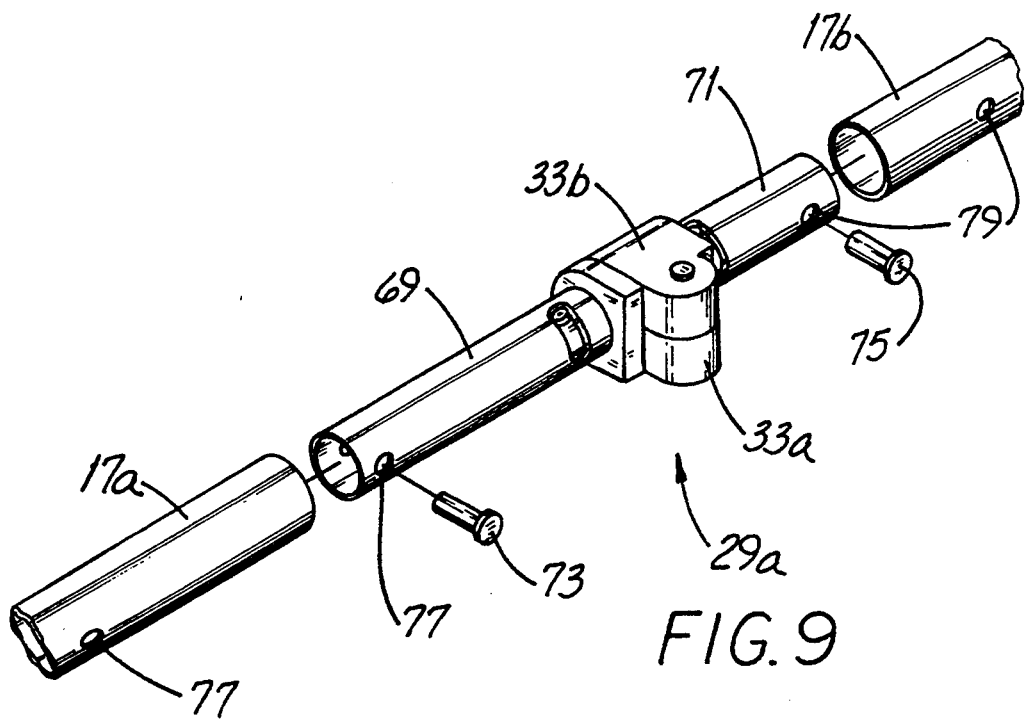
FIG. 9 is a perspective view of the mechanism of FIGS. 3–6 shown in conjunction with tube-like pieces (with part broken away) joined by such mechanism. The mechanism is shown in the locked position.

Referring particularly to FIGS. 9–11, the first link member 33a includes a somewhat elongate barrel-like portion 45a. When the mechanism 29 is installed in the net 10 as shown in FIG. 2, the portion 45a extends along the axis 23 of the outer end 17a and is telescoped to such end 17a. The mechanism 29 also includes a spring 47 (preferably a coiled spring) having its first end 49 attached to the portion 45a. One way to attach the end 49 to the portion 45a is by "turning" the last coil of the spring 47 and inserting such coil tongue-and-groove fashion into the slot 51 in the portion 45a.

The second end 53 of the spring 47 is fixed with respect to the outer end 17a (or other tube piece) into which it extends. Such end 53 may be fixed by forming a retaining tang 55 in the wall 57 and crimping the end 53 under the tang 55. It should be appreciated that during spring installation, the spring should be "torqued" or turned somewhat from its natural repose position to create some "preload" or torsional bias. This helps assure that when the ends 17a, 17b and are attached as described, the spring 47 tends to urge the link members 33 to the first position as the spring 47 tries to return to its repose position.

Referring further to FIG. 10, the second link member 33b also includes a somewhat elongate barrel-like portion 45b extending along the axis 23 of the outer end 17b and telescoped to such end 17b. Each portion 45 has a radially-protruding pin 59, 61 movable in a slot, i.e., slots 63 and 65, respectively.

In a highly preferred embodiment, a pin 59, 61 is at the first slot 67a end when the link members 33 are in the first or lockup position. The pins 59, 61 and the slot end 67a thus form a "stop" to limit rotational travel of the members 33. This helps assure that in the lockup position, the members 33 are positioned such that the faces 37 are generally coincident to or parallel with the plane 43. Maximum net rigidity results.

While not a requirement, it is also preferred that the pins 59, 61 and slots 63, 65 are cooperatively configured and positioned so that the pins 59, 61 are at the second slot end 67b when the link members 33 are in the second or "foldup" position. With this arrangement, the user need not guess when the link members 33 are in position for smooth net folding; s/he simply pushes the link members 33 toward the second position until the pins 59, 61 contact their respective slot ends 67b. The user is thus assured that the faces 37 are then essentially normal to the plane 43 and the net 10 can be folded without risk of damaging the parts.

A comparison of FIGS. 2, 7, 9 and 10 on the one hand with FIGS. 8 and 11 on the other will help appreciate how the mechanism 29 works. FIGS. 2, 7, 9 and 10 show the mechanism 29 as it would be with the net 10 unfolded ready for use and the link members 33 in the first or lockup position. FIGS. 8 and 11 show the mechanism 29 as it appears in the second or foldup position.

The outer mechanism 29 can be used in either of at least two ways. One way is to install such mechanism 29 so that the portions 45 extend directly into the outer ends 17a, 17b, respectively, of the net frame members 13, 15. In that event, the slot 63 and tang 55 are formed in the wall 57 of the end 17a and the slot 65 formed in end 17b. FIG. 10 shows how the mechanism 29 is installed directly into the frame outer ends 17. (Parenthetically, it will be appreciated after analyzing this specification that components of the outer mechanism 29 can be reversed end-for-end with respect to the frame outer ends 17 and still achieve the same result.)

Referring now to FIG. 9, another way to use the outer mechanism 29 is to build it as an assembly for later attachment to the outer ends 17 or to other tube-like pieces used for other purposes. As an assembly, the mechanism 29a includes short lengths of tubes identified as 69 and 71 in FIG. 9. The tang 55 and slots 63, 65 are formed in such tubes 69, 71 as illustrated and when used to make a folding landing net 10 or for other purposes, the tubes 69, 71 are slidably telescoped into the outer ends 17a and 17b, respectively. The tubes 69, 71 and ends 17a, 17b are held tightly together, preferably by pop-rivets 73, 75 inserted through appropriate holes 77, 79, respectively. If the assembly is used to make a net 10, it is preferred that such rivets 73, 75 be installed so that their heads are toward the interior of the net 10. The outer edge of the net frame 11 is often scraped across rocks when in use and such rivet positioning helps avoid wearing away the rivet head.

Figure 12:
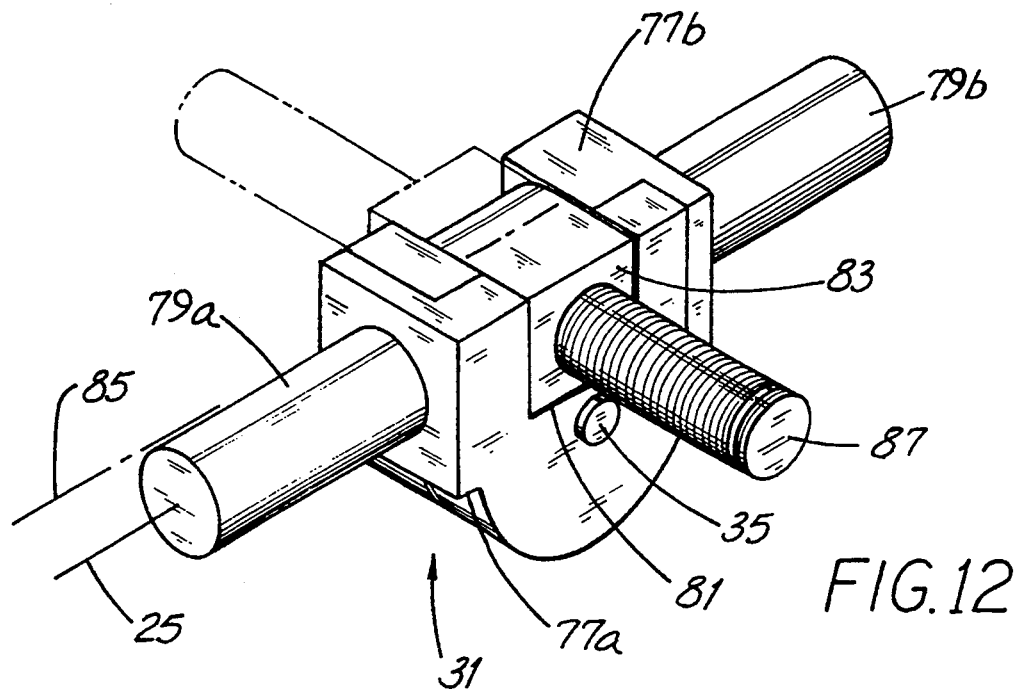
FIG. 12 is a perspective view of the inward mechanism shown in FIG. 2. The mechanism is shown in the locked position and the alternate foldup position of the handle mounting block and handle stud are shown in phantom outline.
Figure 6:
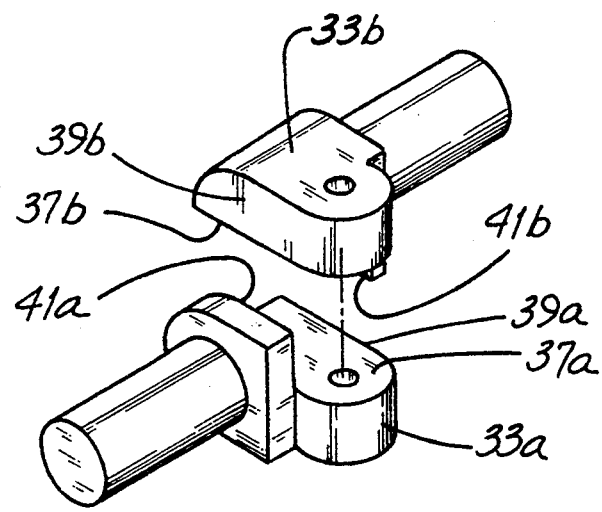
FIG. 6 is a perspective view of the mechanism of FIGS. 3–5 with the mechanism parts slightly separated.
Figure 13:
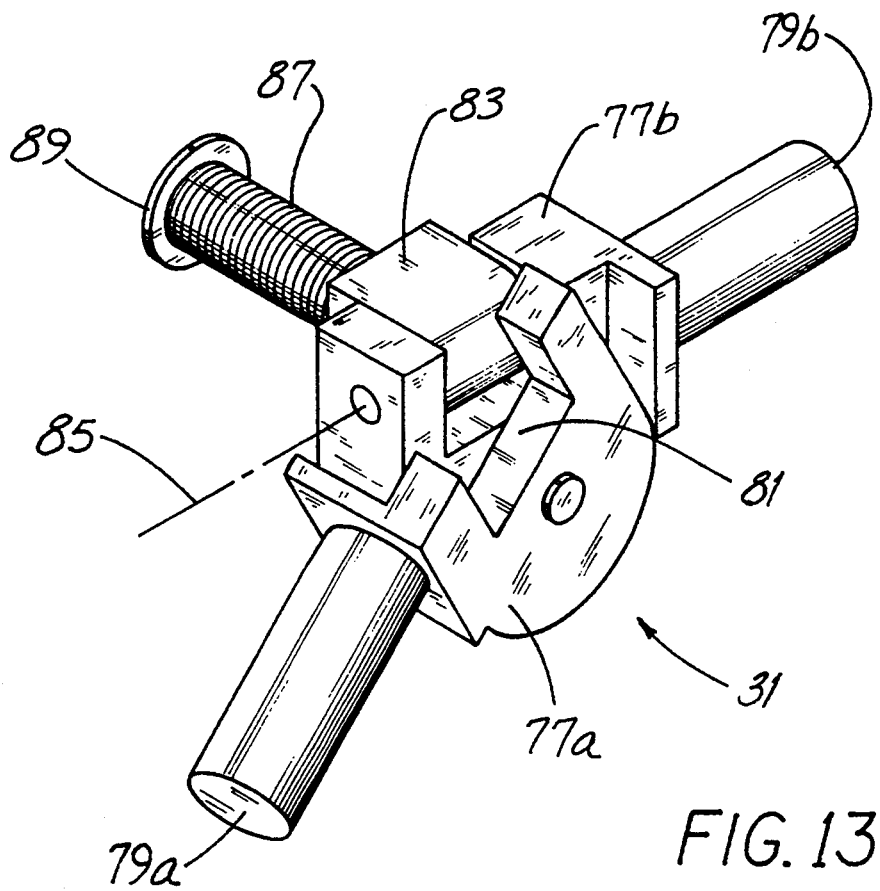
FIG. 13 is a perspective view of the mechanism of FIG. 12 shown in an unlocked joint-like position for net foldup.

Referring now to FIGS. 2, 12 and 13, a highly preferred embodiment of the improved landing net 10 has additional features relating to the inward hinge-like mechanism 31 adjacent to the handle 21 and relating to the handle 21 itself. Such features make the net 10 very convenient to use and compact to carry without risking the loss of parts.

The inward ends 19 of the frame members 13, 15 (those ends 19 adjacent to the handle 21) are generally coextensive with axis 25 when the net 10 is unfolded ready for use. The ends 19 are joined by a hinge-like inward mechanism 31 having first and second generally C-shaped members 77a, 77b, respectively. Each member 77a, 77b has a cylindrical post 79a or 79b, respectively, telescoped into (or over) an end 19a or 19b, respectively. Each post 79 is permanently fastened to its respective end 19 as with a pop rivet 73 or 75 much in the same fashion as described above. Such members 77 are coupled to one another by a pin-like fastener 35 in much the same way as the link members 33 are fastened together.

The first C-shaped member 77a has a groove 81 across it, i.e., extending generally normal to the axis 25. The second C-shaped member 77b includes a handle mounting block 83 pinned thereto for "swinging" movement of the block 83 into and out of the groove 81. As shown in FIGS. 8 and 12, the block 83 swings about an axis 85 generally parallel to the axis 25.

When the net 10 is unfolded, the C-shaped members 77a, 77b are brought to a position where they are generally in registry with one another. The block 83 is then "swung" into the groove 81. The width of the block 83 is selected to be only slightly less than the width of the groove 81 so that the block 83 substantially prevents relative movement of the C-shaped members 77a, 77b one to the other. The net 10 is thus rigidly retained unfolded ready for use.

Explained in another way, the C-shaped members 77a, 77b are fastened together to permit relative "scissors-like" movement of the members 77 one to the other so long as the block 83 is clear of the groove 81. When the handle mounting block 81 is pivoted into the groove 81, it prevents such scissors-like movement and retains the C-shaped members 77 "locked" together, i.e., relatively immovable one to the other. After the block 83 is so positioned, the handle 21 is tightened by means described below.

The handle mounting block 83 has a handle stud 87 extending from it and the handle 21 is threaded to the stud 87. By rotating the handle 21 with respect to such stud 87, the user tightens the handle 21 preparatory to using the net 10 or loosen it so that the block 83 can be swung 180° out of the groove 81 and the net 10 then folded.

Figure 14:
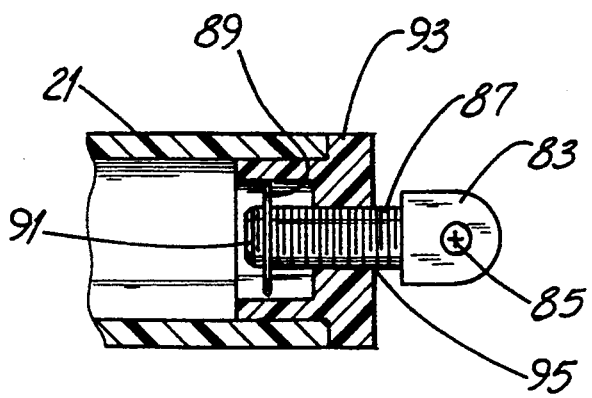
FIG. 14 is a side elevation view, partly in cross-section and with parts broken away, of the net handle connected to the handle stud of the mechanism of FIGS. 12 and 13.

Referring next to FIG. 14, in a highly preferred embodiment, the stud 87 has a handle retaining device, e.g., a lock washer 89, attached thereto near the stud distal end 91. The handle 21 includes an attached bushing 93 having a threaded aperture 95 through it for receiving the stud 87. Since the aperture 95 is smaller than the retaining device 89 and since the bushing 93 is interposed between the mounting block 83 and the device 89, the handle 21 is retained on the stud 87. However, such handle 21 may be loosened or tightened for the purposes described above.

Figure 15:
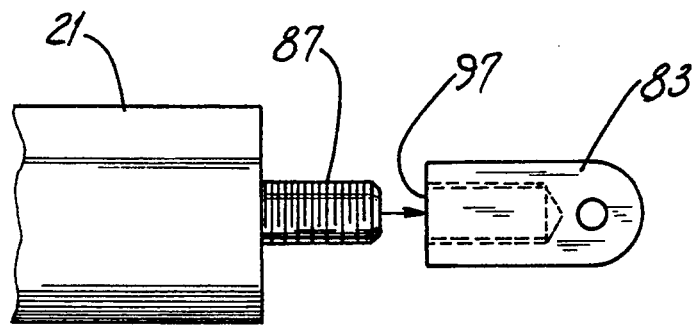
FIG. 15 is a side elevation view of an alternate embodiment of the handle and mounting stud. Parts are broken away and thread surfaces are shown in dashed outline.

In another embodiment, the retaining device 89 is omitted so that the handle 21 may simply be removed entirely. But one of the desirable features available in the new landing net 10 is that there need not be any loose parts to manipulate or become lost. While the configuration having no retaining device 89 is somewhat simpler in construction, it increases the risk that the handle 21 might become lost. In yet another configuration shown in FIG. 15, the stud 87 is permanently attached to the handle 21 and the mounting block 83 has a threaded hole 97 to receive such stud 87. In such configuration, the handle stud 87 is merely screwed to or unscrewed from the mounting block 83.

As shown in FIG. 1, the improved landing net 10 may be conveniently stowed and carried in a soft, substantially flat pouch 99. Such pouch 99 is conformably shaped to the outline of the net 10 when the net 10 is folded.

Referring again to FIGS. 2 and 9, it is now apparent how the hinge-like mechanism 29 can be used to joining elongate first and second tube-like pieces which, as identified as ends 17a, 17b, are part of a landing net 10. But, of course, other tube-like pieces (part of a structure other than a landing net 10) can likewise be joined. That is to say, the hinge-like mechanism 29 can be fabricated as an assembly for a variety of purposes.

While the invention has been described in connection with a few preferred embodiments, it is to be understood clearly that such embodiments are by way of example and not limitation.

I claim:

1. In a fish landing net having a handle extending along a handle axis and having elongate first and second frame members and wherein (a) each frame member has an outer end away from the handle and an inward end adjacent to the handle, and (b) the outer ends are joined by a hinge-like outer mechanism, the improvement wherein:
   the frame members define a plane;.
   the outer ends extend along an end axis which is substantially normal to the handle axis and coincident with the plane;
   the outer mechanism is mounted for pivoting movement about the end axis; and,
   pivoting movement is between a first position preventing folding the frame members and a second position permitting folding such members.

2. The net of claim 1 wherein the outer mechanism is urged toward the first position by a spring.

3. The net of claim 2 wherein;
   one of the frame members has a slot formed therein; and
   at least one link member has a pin moving in the slot when the outer mechanism is pivoted between the first and second positions, whereby the pin and slot coact to limit pivoting movement.

4. The net of claim 3 wherein the slot has first and second ends and the pin is at the first slot end when the outer mechanism is in the first position and is at the second slot end when the outer mechanism is in the second position.

5. The net of claim 1 wherein:
   the inward ends are joined by a hinge-like inward mechanism having first and second generally C-shaped members coupled to one another; and,
   the second C-shaped member has a groove thereacross.

6. The net of claim 5 wherein the first C-shaped member includes a handle mounting block pinned thereto for swinging movement of the block into and out of the groove.

7. The net of claim 6 wherein:
   the C-shaped members are generally in registry with one another; and,
   the block is in the groove and substantially prevents relative movement of the C-shaped members one to the other,
   whereby the net is retained unfolded ready for use.

8. The net of claim 6 wherein the handle mounting block has a handle stud extending therefrom and the handle is threaded to the stud for easy handle removal when the net is being folded.

9. The net of claim 6 wherein:
   the handle mounting block has a threaded handle stud extending therefrom;
   the stud has a handle retaining device attached thereto;
   the handle includes a bushing having an aperture therethrough for receiving the stud;
   the aperture is smaller than the retaining device; and,
   the bushing is interposed between the mounting block and the retainer,
   whereby the handle is retained on the stud and may be loosened to facilitate net folding.

10. In a fish landing net having a handle and elongate first and second frame members and wherein (a) each frame member has an outer end away from the handle and an inward end adjacent to the handle, and (b) the outer ends are joined by a hinge-like outer mechanism, the improvement wherein:
    the outer ends extend along an axis;
    the outer mechanism is mounted for pivoting movement about the axis;
    pivoting movement is between a first position preventing folding the frame members and a second position permitting folding such members;
and wherein:
    the frame members define a plane when the net is unfolded ready for use;
    the outer mechanism includes first and second link members attached to one another;
    each link member has a substantially planar face in contact with the face of the other member;
    the faces are substantially coincident with the plane and the outer mechanism forms a beam-like structure when such mechanism is in the first position; and
    the faces are substantially normal to the plane when the outer mechanism is in the second position.

11. In a fish landing net having a handle and elongate first and second frame members and wherein (a) each frame member has an outer end away from the handle and an inward end adjacent to the handle, and (b) the outer ends are joined by a hinge-like outer mechanism, the improvement wherein:
    the outer ends extend along an axis;
    the outer mechanism is mounted for pivoting movement about the axis and is urged toward a first position by a spring;
    pivoting movement is between the first position preventing folding the frame members and a second position permitting folding such members;
    one of the frame members has a slot;
    at least one link member has a pin moving in the slot when the outer mechanism is pivoted between the first and second positions, whereby the pin and slot coact to limit pivoting movement;
and wherein:
    the slot has first and second ends and the pin is at the first slot end when the outer mechanism is in the first position and is at the second slot end when the outer mechanism is in the second position.

12. In a fish landing net having a handle and elongate first and second frame members and wherein (a) each frame member has an outer end away from the handle and an inward end adjacent to the handle, and (b) the outer ends are joined by a hinge-like outer mechanism, the improvement wherein:
    the outer ends extend along an axis;
    the outer mechanism is mounted for pivoting movement about the axis;

pivoting movement is between a first position preventing folding the frame members and a second position permitting folding such members;

and wherein:

the inward ends of the frame members are joined by a hinge-like inward mechanism having first and second generally C-shaped members coupled to one another;

the second C-shaped member has a groove thereacross;

the first C-shaped member includes a handle mounting block pinned thereto for swinging movement of the block into and out of the groove;

the handle mounting block has a threaded handle stud extending therefrom;

the stud has a handle retaining device attached thereto;

the handle includes a bushing having an aperture therethrough for receiving the stud;

the aperture is smaller than the retaining device; and, the bushing is interposed between the mounting block and the retainer.

13. In a fish landing net having a handle and elongate first and second frame members and wherein (a) each frame member has an outer end away from the handle and an inward end adjacent to the handle, and (b) the outer ends are joined by a hinge-like outer mechanism, the improvement wherein:

the frame members generally define a plane when the net is unfolded ready for use;

the outer mechanism includes a pair of link members, each having a generally flat face;

the outer mechanism is mounted for pivoting movement between a first position and a second position, and wherein:

in the first position, the faces of the link members are generally parallel to the plane and folding of the frame members is prevented; and in the second position, the faces of the link members are generally normal to the plane and folding of the frame members is permitted.

* * * * *